Figure 1:
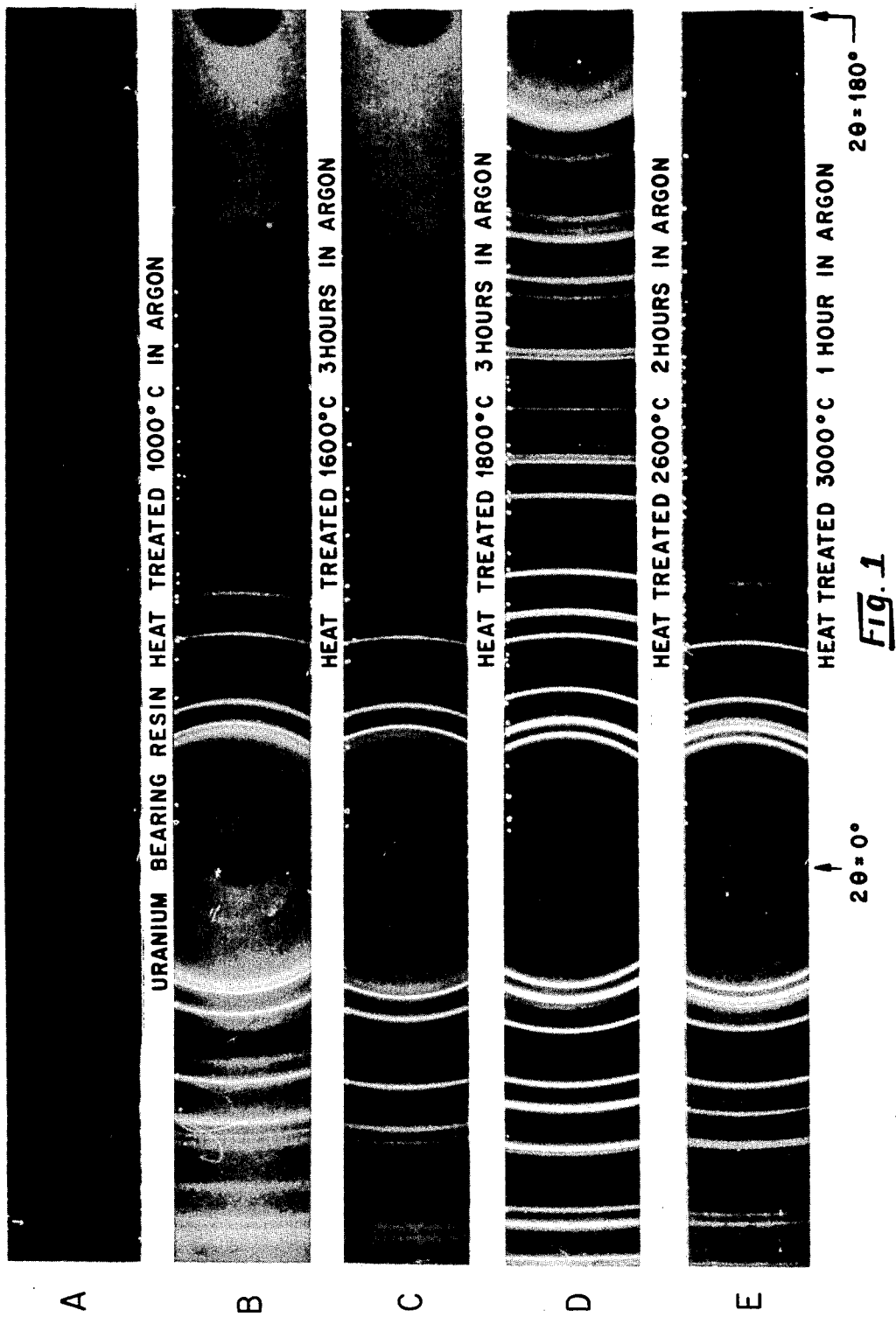

United States Patent [19]
Pollock et al.

[11] 3,856,622
[45] Dec. 24, 1974

[54] HIGH TEMPERATURE NUCLEAR REACTOR FUEL

[75] Inventors: Charles B. Pollock, Oak Ridge; James L. Scott, Knoxville; James M. Leitnaker, Kingston, all of Tenn.

[73] Assignee: The United States of America as represented by the United States Atomic Energy Commission, Washington, D.C.

[22] Filed: Apr. 18, 1972

[21] Appl. No.: 246,096

[52] U.S. Cl. ........ 176/68, 176/91 SP, 252/301.1 R, 264/.5
[51] Int. Cl. .............................................. G21c 3/04
[58] Field of Search ................. 252/301.1 R; 264/.5; 176/67–69, 91 SP

[56] References Cited
UNITED STATES PATENTS

| | | | |
|---|---|---|---|
| 3,194,745 | 7/1965 | Handwerk et al. | 176/67 |
| 3,264,223 | 8/1966 | Baskin et al. | 252/301.1 R |
| 3,298,921 | 1/1967 | Bokros et al. | 176/67 |
| 3,334,050 | 8/1967 | Grotenhuis et al. | 252/301.1 R |
| 3,403,008 | 9/1968 | Hamling | 264/.5 X |
| 3,438,749 | 4/1969 | Lonadier et al. | 264/.5 X |
| 3,578,610 | 5/1971 | Johnson et al. | 264/.5 |
| 3,673,101 | 6/1972 | McKenny et al. | 252/301.1 R |

*Primary Examiner*—Harvey E. Behrend
*Attorney, Agent, or Firm*—John A. Horan; David S. Zachary; Irving Barrack

[57] ABSTRACT

A nuclear fuel comprising a kernel containing a dispersion of a uranium compound within a carbon or graphite matrix, said kernel containing less than 0.5 weight percent oxygen and an ameba-inhibiting concentration of sulfur and at least one pyrolytic carbon coating encasing said kernel, and a process for making same.

3 Claims, 2 Drawing Figures

HIGH TEMPERATURE NUCLEAR REACTOR FUEL

BACKGROUND OF THE INVENTION

The invention described herein was made in the course of, or under, a contract with the U.S. Atomic Energy Commission.

The present invention relates to a unique porous, graphitic nuclear fuel and to a method for its manufacture. Structurally, the nuclear fuel consists of two components: (1) a fuel kernel comprising a porous carbonized or graphitized matrix with a significant percentage, 20 to 50 percent, closed pores, a fairly homogeneously dispersed phase of a uranium carbide within said matrix containing less than 0.5 weight percent oxygen and an effective ameba-inhibiting concentration of sulfur and (2) at least one coating of pyrolytic carbon deposited on the surface of said kernel. Functionally, the fuel [kernel coating(s)] is characterized as a dimensionally stable article as evidenced] at temperatures from 1000°C. to 3000°C. with a minimum to no susceptibility to a particular form of thermal stress known as the "ameba effect."

When a thermal gradient is created at a temperature in excess of about 1200°C. in a uranium carbide fuel core encased in a pyrolytic carbon coating, the fuel will migrate or diffuse across the thermal gradient from the cold side to the hot side of the gradient for a sufficient distance into the coating to disrupt or fracture the coating. The operating temperature limit for a densified or porous uranium carbide fuel kernel coated with pyrolytic carbon is thus set by this ameba effect. Although the mechanism involved in the ameba effect is not thoroughly understood, it is known to increase exponentially with temperature. Uranium-carbide-containing fuels that can survive for several years at temperatures in the range 1000°C. to 1200°C. fail in a matter of hours at 1600°C. On the other hand, the fuel particles of this invention show almost no evidence of ameba effect at temperatures in the range 1800° to 2100° C. It is accordingly the principal object of this invention to provide a nuclear fuel having the aforementioned combination of qualities and to provide a process whereby such a fuel may be obtained.

The high temperature qualities of a carbon-, carbide-, or graphite-coated nuclear fuel depends in large part on the core or kernel material. The highest theoretical operating fuel temperature, excluding thermal and mechanical stresses, is the melting point of the core material. While many compounds of uranium have utility as a core material, the carbides of uranium are preferred. UC has a melting point of approximately 2500°± 25°C. and $UC_2$ has a melting point of 2445°C. with reported melting points in the range 2350° to 2475°C. $UO_2$ has a melting point of 2800°C., but excessive CO pressure within the carbon coating is observed above 2200°C. As a practical matter, the maximum permissible operating temperature of the fuel is limited to the temperature at which adverse ameba effects occur--namely, no more than about 1200°C. Since the reactor fuel of this invention did not appear metallographically to have melted when heated above 3000°C. and does not subject coatings to adverse pressure stresses even at temperatures of up to 2800° C., the fuel provided by this invention permits application to nuclear reactors having a peak transient temperature in excess of the melting point of uranium carbides.

SUMMARY OF THE INVENTION

Our invention is based on a two-fold discovery critical to obtaining the above-noted extraordinary high temperature qualities. First, it has been our finding that the presence of sulfur is required in the coated fuel kernel in order to reduce or eliminate the ameba effect at 2100°C. Secondly, we found that dimensional stability of a coated fuel can only be realized if the uncoated fuel kernel is heated in an inert atmosphere at a temperature in the range 1400° to 2000° C. in order to deoxidize the fuel kernel to an oxygen content no greater than 0.5 weight percent and preferably in the range 0.02 0.2 percent. If the oxygen content is greater than 0.5 percent, an isotropic pyrolytic coating applied to a fuel kernel will expand, in the extreme case, to the point of fracture and, in any case short of fracture, to a highly undesirable non-isotropic form. On the other hand, a properly deoxidized sulfur-containing fuel kernel can be treated by fairly conventional means to impart an isotropic pyrolytic coating which will remain isotropic and exhibit dimensional stability even at graphitizing temperatures.

It should be emphasized that both features (i.e., deoxidation of the fuel kernel, and the presence of sulfur in the kernel) are critical and necessary to obtaining a coated fuel with the desirable combination of maximum dimensional stability and minimum or elimination of the ameba effect.

The nuclear fuel of this invention having the aforementioned extraordinary high temperature stability can be prepared from thermosetting, sulfur-containing ion exchange resins as represented by Dowex-50 or Dowex-50W, a product of the Dow Chemical Company, Midland, Michigan, a strongly acidic cation exchange resin formed by the copolymerization of styrene and divinyl benzene containing ionizable sulfonic acid groups and available for use as small spheres or beads of good hydraulic properties. The fraction of divinyl benzene in the resin determines the extent to which the bead is free to swell and shrink and the degree of thermosetting quality. For the purposes of this invention, a resin having from 4 to 12 percent crosslinkage provides an acceptable degree of swelling and supplies sufficient structure to make the resin thermosetting. The degree of crosslinkage refers to the fraction of divinyl benzene it contains and is indicated by an X following the name of the resin. Thus, a resin of 8 percent crosslinkage would be identified as Dowex--50X-8, signifying a copolymer composed of 8 percent divinyl benzene and 92 percent styrene and other monovinyl monomers.

The fuel kernel portion of the nuclear fuel is produced by the generalized procedure disclosed in copending patent application Ser. No. 48,579 of common assignee, now abandoned, the total disclosure of which is hereby incorporated by reference. In said copending application, spheroidal particles are prepared by immersing or contacting spheroidal organic ion exchange resin particles containing sulfonic acid groups with an aqueous solution of a uranyl salt to achieve a desired uranium loading, drying the loaded resin particles at a noncarbonizing temperature, carbonizing the particles, preferably in a fluidized bed using inert gas such as argon or helium as the fluidizing medium. The carbonized product comprises a uranium oxide as uranium dioxide associated with a carbon matrix. By heating the carbonized product, in vacuum or inert atmosphere, to a temperature in the range 1400° to 2000° C., deoxidation occurs and the $UO_2$ is converted to a uranium-carbide-containing dispersed phase within a carbon matrix. Deoxidation conditions are maintained until an oxygen content no greater than 0.5 and preferably less than 0.2 weight percent is reached.

IN THE DRAWINGS

Figure 2:
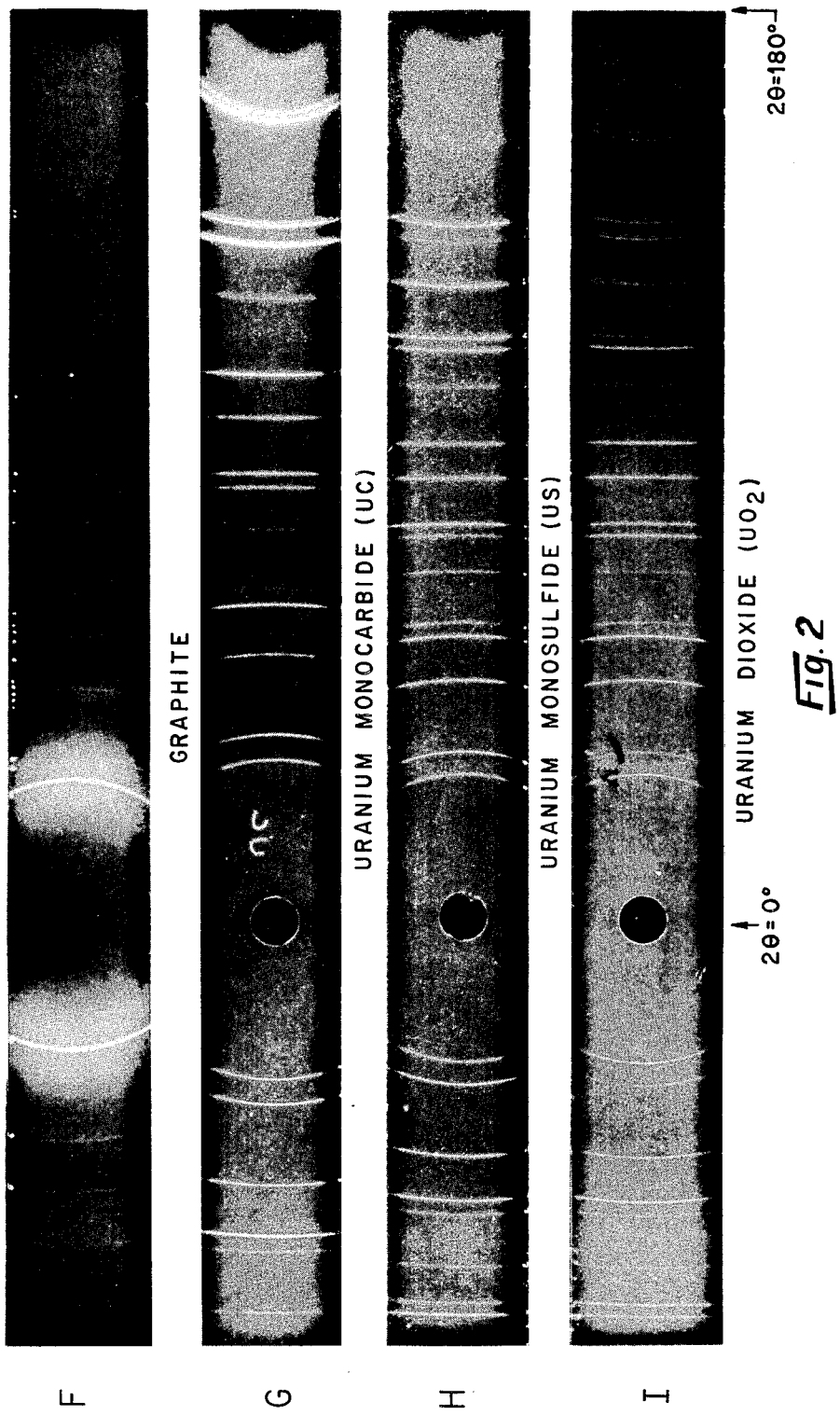

FIG. 1, A-E are x-ray diffraction patterns resulting from heat treating uranium and sulfur — containing resins in argon to temperature in the range 1000°C to 3000°C. FIG. 2, F-I are reference diffraction patterns for UC, US, $UO_2$ and graphite which are presented for purposes of comparison with the patterns of FIG. 1, particularly those treated at temperatures from 1600° to 3000°C as represented by FIG. 1 B, C, D, and E.

We have found that when thermosetting organic ion exchange resins, having a hydrocarbon network to which are attached sulfonic acid groups which serve as ionic sites for ion exchange, are utilized as the starting material, the product of this invention can be produced provided that the prescribed modifications are employed. In the ensuing description, unless otherwise noted, we utilize Dowex-50X-8 or the equivalent Dowex-50W-8-X as the resin from which the particles are synthesized. The critical process and product parameters will be elucidated in the following description representing exemplary embodiments of the invention.

EXAMPLE I

Preparation of the Carbonized Resin Kernel

One pound of Dowex-50W cation exchange resin beads, having 50-100 mesh size, was soaked for 16 hours in a uranyl nitrate solution. This solution was prepared by dissolving $U_3O_8$ in 8 N nitric acid. Subsequent dilution with distilled water produced an approximate 0.5 N $UO_2(NO_3)_2$ solution.

The loaded resin beads were dried at 110°C. for 16 hours after which they were carbonized in a fluidized bed using helium as the fluidizing medium. Drying at 110°C. is necessary prior to any further thermal treatment in that undried particles will cluster and fragment in subsequent thermal cycling. Carbonization was accomplished at 1000°C. using a maximum temperature rise of no more than 200°C./hr. A greater heating rate causes particle fracturing as the volatiles are released during heatup.

The resultant uranium-loaded microspheres contained sulfur, as indicated by chemical analysis. The sulfur was present because sulfonated cation exchange resins were used. At 1600°C., uranyl ions on sulfonated cation resins convert to a U-S-C-containing compound, as indicated by X-ray diffraction analysis. (Compounds of uranium and oxygen and carbon woould result if the carboxylic acid form of cation exchange resin were used.) The microspheres had a density of about 1.9 g/cc and a closed porosity of about 40 percent. The microsphere products were further characterized by metallography and microradiography. These techniques showed that a uniform distribution of uranium in the microspheres was achieved.

In a number of similar runs, resin fueled kernels were prepared from Dowex-50X-8 beads. The composition of these kernels after carbonizing (heating in helium atmosphere) to 1000°C. is shown in Table I.

TABLE I

Composition of Fueled Kernels Made from Dowex-50W-X-8 After Carbonizing at 1000°C.

| Run | Composition (weight %) | | | |
|---|---|---|---|---|
| | U | C | O | S |
| 1 | 46.71 | 36.85 | 7.03 | 10.57 |
| 2 | 47.02 | 37.14 | 5.33 | 11.24 |
| 3 | 48.68 | 35.62 | 4.89 | 10.54 |
| 4 | 48.74 | 33.99 | 6.42 | 9.95 |
| 5 | 46.60 | 35.60 | 8.12 | 10 |
| Avg. weight % | 47.55 | 35.84 | 6.36 | 10.51 |
| Avg. mol % | 5.10 | 76.30 | 10.20 | 8.40 |

EXAMPLE II

Deoxidation of the U-Loaded Resin Kernel

In order to convert the uranium oxide in the kernels to carbide form and to ensure the maximum degree of dimensional stability in the final coated product, it is necessary to heat the oxide-containing kernels in vacuum or inert atmosphere such as argon or helium using a temperature rise of from 100° to 200° C./hr. to a temperature in the range of from 1400° to 2000° C. for a period of time sufficient to convert the oxide to carbide form and to reduce the oxygen content below 0.5 weight %.

If deoxidized particles containing more than 0.5 percent oxygen are coated with pyrolytic carbon or carbide, they expand in volume up to as much as 30 percent due to the production of CO resulting from the reaction of the $UO_2$ with carbon and $SO_2$ by reaction of sulfur with oxygen. As deformation of the coating occurs, the pyrolytic carbon coating becomes highly anisotropic as indicated by the response of the coating to polarized light. Such thermal and structural instabilities are intolerable in a reactor fuel and can be avoided by reducing the oxygen content to less than 0.5 percent prior to pyrolytic coating. Typical results of deoxidation are shown in Table II.

TABLE II

Composition of Kernel after Deoxidation Heat Treatment

| Sample No. | Atmosphere | Temp. (°C.) | Time (min) | Composition (weight %) | | | |
|---|---|---|---|---|---|---|---|
| | | | | U | C | O | S |
| 1293 | Argon | 1500 | 30 | 34.0 | 59.9 | .367 | 5.84 |
| 1306 | Vacuum | 1750 | 180 | 48.0 | 43.7 | .078 | 8.30 |
| 1349 | Argon | 1750 | 210 | 51.0 | 45.0 | .30 | 3.67 |
| 1352 | Argon | 1750 | 60 | 41.20 | 55.4 | .20 | 3.20 |
| KN11-10 | Argon | 1000 | 15 | 45.1 | 36.7 | 7.70 | 10.0 |
| KN11-14-1 | Argon | 1400 | 60 | 49.4 | 38.7 | 0.92 | 7.1 |
| KN11-14-3 | Argon | 1400 | 180 | | | 0.87 | |
| KN11-16-1 | Argon | 1600 | 60 | 45.0 | 38.9 | 0.41 | 7.3 |

TABLE II — Continued

Composition of Kernel after Deoxidation Heat Treatment

| Sample No. | Atmosphere | Temp. (°C.) | Time (min) | Composition (weight %) | | | |
|---|---|---|---|---|---|---|---|
| | | | | U | C | O | S |
| KN11-163 | Argon | 1600 | 180 | | | 0.49 | |
| KN11-166 | Argon | 1600 | 360 | 48.2 | 38.0 | 0.32 | 7.1 |
| KN11-183 | Argon | 1800 | 20 | | | 0.41 | |
| KN11-181 | Argon | 1800 | 60 | | | 0.48 | |
| 119-183 | Argon | 1800 | 180 | 49.9 | 39.2 | 0.14 | 7.2 |
| KN11-203 | Argon | 2000 | 20 | 49.7 | 38.7 | 0.23 | 7.3 |
| KN11-201 | Argon | 2000 | 60 | 49.7 | 39.6 | 0.22 | 7.4 |
| FC-128* | Argon | 1800 | 180 | 61.2 | 31.3 | .4 | 3.10 |
| FC-129* | Argon | 1800 | 180 | 58.3 | 25.5 | .5 | 4.00 |

*Kernels derived from macroporous resin Amberlite 200, a sulfonated cation exchange resin available from Rohm & Haas Company.

We were surprised to find that there were still considerably large amounts of sulfur retained in the particles even though substantially all of the oxygen had been removed. The deoxidation heat treatment removes the bulk of the oxygen without affecting the volume of the particles and therefore increases the relative weights of uranium and carbon while retaining a fairly large amount of sulfur. Another phenomenon noted was a dramatic increase in surface area. Fuel particles derived from a strong acid resin with a surface area of 0.2 to 0.6 m²/g at 1000°C. produce a surface area after deoxidation in the range 8 to 16 m²/g.

EXAMPLE III

Coating the Deoxidized Resin Kernel

Uranium-containing microspheres prepared as described in Examples I and II were coated with pyrolytic carbon to give either an interrupted duplex coating or a monolayer coating. For the interrupted duplex coating, a 20-micron-thick, low-density coating (about 1.6 g/cm³) was applied using propylene in a fluidized bed at 1250°C. This was followed by the application of a 50-micron-thick, high-density layer (about 1.8 g/cm³) also using propylene but increasing the temperature to 1900°C.

Monolayers of both 60- and 80-micron thicknesses were applied to some of the microspheres in a fluidized bed using propylene at 1400°C. These coatings had a density of about 1.75 g/cm³.

EXAMPLE IV

Thermal Tests

The samples of resin-derived particles that had been deoxidized and coated with pyrolytic carbon were then subjected to temperatures of up to 3000°C. Particles from batch 1306 that had been coated with a monolayer of pyrolytic carbon at 1250°C. were heated to 3000°C. for 0.5 hr. in a graphite crucible in an argon atmosphere. After the thermal test, the particles were examined metallographically, visually, and by microradiography. In the visual examination, we found that greater than 99 percent of the particles were unaffected by the test. A volume expansion of 6 percent was noted. The slight volume expansion indicated that a few particles were deformed by excessive gas pressure. No evidence of metal migration was noted. The major effect noted was some densification of the kernels that left a small gap between coating and kernel and some vaporization of uranium in this gap. A microradiograph of the particles heated to 3000 C. for 0.5 hr. showed a structure unchanged from that existing prior to heat treatment except for some densification of the kernel phase. The formation of graphite would account for the kernel densification. Long-term heat treatment at 2600° and 2800° C. showed the same lack of metal migration. Unlike the particles heated to 3000°C., no uranium vaporization, weight or volume changes were noted in the particles heated to 2800°C.

A similar batch 1293 that contained more oxygen (0.367%) than did batch 1306 (0.078%) was tested at the same time. We observed no weight change in this batch after thermal testing at 3000°C., but did observe a 25-percent increase in volume. An examination of the microradiograph taken after the test showed a volume increase in a number of particles. However, the survival rate for this batch was greater than 97 percent, with very little damage to the kernels being observed. Again, in long-term thermal tests at 2600° and 2800° C. there was no change in weight or volume, and 100 percent of the particles survived without evidence of ameba effect.

EXAMPLE V

The Need for Sulfur

Evidence that the presence of sulfur is essential to the high temperature stability was deduced from the following comparative experiments.

1. Fuel kernels were fabricated from methyl acrylic acid-divinyl benzene resins where the active groups are the carboxylic type which contain no sulfur. After carbonizing at 1000°C. these particles were deoxidized in the same way as the sulfonic acid type resins had been. The particles were then coated with pyrolytic carbon coatings using propylene and heated to 2400°C. for 1 hr. Microradiographs of these particles revealed that the uranium migration through the coatings was so bad that the coating could not be distinguished from the kernel after heat treatment. The only known difference between these particles and the good particles described previously was the starting resin and the absence of sulfur.

2. As a further check, conventional densified $UC_2$ particles and coated particles with deoxidized kernels but containing 5.84–8.30% sulfur (runs 1293 and 1306) were heat-treated in the sample graphite boat for 6.5 hr. at 2600°C. The deoxidized non-sulfur-containing particles failed completely in that the uranium migrated completely through the coatings and the particles had bonded or sintered together, whereas the sulfonic acid resin-derived particles showed no uranium diffusion and did not sinter.

3. To further establish the properties of kernels, i.e., uncoated particles, derived from ion-exchange resins of both the strong sulfonic acid and non-sulfur-containing weak acid types were heat-treated in argon above 2000°C. Kernels derived from the weak acid resins were found to sinter together above 2400°C., indicating that the $UC_2$ fuel form had melted and bonded the particles together. With kernels derived from the sulfonic acid strong-acid resins (of the Dowex-50 type), no sintering was observed even at 3000°C. The principal effect noted was some loss of uranium from the surface of the particles, probably by vaporization. The particles were also found to densify at 2800°C. This densification is attributed to graphitization of the carbon substrate. Densities of various batches measured with a mercury pycnometer are shown in Table III after carbonization, deoxidation, and heat treatment at 2800°C. The density decrease between 1000° and 1750 C. is attributed to the loss of CO and $SO_2$ from the kernels without changing the particle volume.

of the kernel had taken place with indications of slight recoil damage to the inner pyrolytic coating.

In a second irradiation test in the HFIR target, resin-derived particles containing 10 percent enriched uranium with 10 percent $^{235}U$ were irradiated at temperatures of 700° and 1050° C. to fluences of 5 and $7 \times 10^{21}$ neutrons/cm² (E > 0.18 MeV) and to burnups of 15 and 18.5 percent heavy metal. Again, slight shrinkage of the kernel was noted with no evidence of ameba effect or failed coatings.

X-ray Diffraction Analysis of Uranium-bearing Sulfonic Acid Resin Fuel Particles Sulfonic acid resin particles of the Dowex-50 type containing approximately 50 percent U by weight were heat-treated in argon at 1000°C. The X-ray patterns of these materials consisted only of very broad diffraction bands at $2\theta$ (twice the Bragg angle) values of ~29°, ~33°, ~47°, and ~56° when using $CuK\alpha$ X-rays.

TABLE III

The Effect of Heat Treatment on the Density of Strong-acid Resins Loaded with Uranium to Several Different Levels

| Starting U Content[a] (wt.%) | Kernel Density (g/cm³) | | |
|---|---|---|---|
| | After Carbonization to 1000°C. | After Deoxidation at 1750°C. | After 2800°C. in Argon |
| 49.0 | 2.99 | 2.16 | 2.56 |
| 52.5 | 3.03 | 2.40 | 2.77 |
| 37.2 | 2.57 | 2.03 | 2.10 |
| 35.0 | 2.28 | 1.67 | 2.02 |

[a]After carbonizing to 1000°C.

EXAMPLE VI

Ameba Testing of Coated Fuels Under a Temperature Gradient

The first experiment was conducted at an average temperature of 1800°C. with a 300°C. drop across a single particle. The particles from batch 1306 were heated first for 11 hr. and then for an additional 20 hr. A microradiograph of resin-derived particles and conventional densified $UC_2$ particles both of which had a buffer coating and a dense outer coating of pyrolytic carbon showed that, after the 11-hr. treatment, extensive kernel migration and uranium contamination had occurred in the case of the conventional $UC_2$ kernel, whereas the resin-derived particles were unaffected by the heat treatment. Particles containing sol-gel-derived $UO_2$ kernels were also relatively unaffected by the test.

A second experiment was performed at an average temperature of 2100°C. for 110 min. with a 400°C. temperature drop across a single particle. Extensive kernel migration was noted with both the conventional $UC_2$ and $UO_2$ kernels, but again the kernels derived from strong-acid (Dowex-50) type resins were unaffected by the heat treatment.

Irradiation Testing

Two irradiations of sulfonic acid resin-derived particles were made. In the first, test particles fueled with natural uranium with two-layer propylene-derived coatings were irradiated to a fluence of $6\,33\ 10^{21}$ neutrons/cm² (E > 0.18 MeV) in the target of the High Flux Isotope Reactor (HFIR) at 1050°C. The burnup was about 8 percent of the heavy metal atoms. A comparison of the particles before and after irradiation showed no evidence of ameba effect. Some shrinkage Heat treatment at 1600°C. for 1 hr. resulted in the appearance of two crystalline phases. One phase had cubic symmetry with $a= 5.46A$ and the other was poorly crystallized graphite. Heat treatment at 1600°C. for longer times up to 6 hr. resulted in improvement in the crystalline perfection of the phases present. Also, new diffraction lines were developed which could only be indexed by invoking a doubling of the unit cell described previously; i.e., $a_0 = 10.8A \approx 2 \times 5.46A$. This phase apparently contained uranium, sulfur, oxygen, and carbon. The X-ray results from some of these heat-treated resins containing uranium are given in FIG. 1. for purposes of comparison, diffraction patterns for UC, US, $UO_2$, and a well-crystallized natural flake graphite are given in FIG. 2. Some rhombohedral graphite was always present in the specimens.

The dominant phase is cubic and the X-ray pattern is similar to that of $UO_2$ or US. These compounds are nearly indistinguishable by X-ray powder diffraction methods due to the similarity of their X-ray diffraction extinctions and the similarity of their lattice parameter of 5.460A and 5.486A, respectively. Due to the low oxygen and high sulfur contents of the heat-treated resin materials as indicated in Table IV, the cubic phase having a unit cell of $\approx 10.8A$ must be based upon the sulfide rather than the oxides as there was not sufficient oxygen in the material for it to be predominantly $UO_2$. A heat treatment at 1800°C. for 3 hr. resulted in material consisting of the cubic phase having a unit cell of $\approx 10.8A$ and graphite. The X-ray diffraction patterns from samples heated to 1000°, 1600°, 1800°, 2600°, and 3000° C. are given in FIG. 1. Heat treatment at 1800°C. for 3 hr. results in fuel particles consisting of the previously mentioned cubic phase with a unit cell of $\approx 10.8A$ and graphite. Maintaining the material at 2600°C. for 2 hr. results in a large amount of $UC_2$ being in the resin particles when they are cooled and examined at room temperature. These samples consisted of $UC_2$, graphite, and the cubic phase having a unit cell of ≈10.8A. The $UC_2$ phase was predominant in the samples that had been heated to 2600°C. for 2 hr. Specimens heated to 3000°C. for 1 hr. exhibited a different ratio of phases than did those tested at 2600°C. The material heated to 3000°C. and then cooled to room temperature consisted of $UC_2$, graphite, and the cubic phase with a unit cell of ≈10.8A, but in this case the cubic phase was predominant. The graphite was also well crystallized as the (002) diffraction line of the graphite had a high intensity on the X-ray patterns.

Although the cubic phase having a unit cell of ≈10.8A was present in the samples heated to various temperatures, the diffraction pattern of the phase exhibited significant changes in some of the line intensities as the test temperature was increased. Note from FIG. 1A that the superstructure of the phase having a unit cell of ≈10.8A was not developed sufficiently in 1 hr. at 1600°C. for the (111) and (200) lines to appear.

TABLE IV

Chemical Contents of Uranium-Loaded Resin Samples Used in X-ray Diffraction Study

| Fig. No. | Original Kernel No. | U (wt. %) | S (wt. %) | O (wt. %) | C (wt. %) | Thermal Test Conditions |
|---|---|---|---|---|---|---|
| 1B[a] | 100-16-3 | 53.43 | 8.34 | 0.64 | 35.88 | 1600°C. - 3 hr. |
| 1C[a] | 611-18-3 | 53.1 | 7.36 | 1.49 | 34.0 | 1800°C. - 3 hr. |
|  | 611-18-3[b] | 29.5 | 2.84 |  | 66.9 | Coated 611-18-3 before test |
| 1D[c] |  | 29.32 | 0.38 |  | 69.24 | 2600°C. - 2 hr. |
|  | 610-16-1[a] | 55.94 | 8.22 | 2.22 | 34.08 | 1600°C. - 1 hr. |
|  | 610-16-1[b] | 36.5 | 4.43 |  | 58.15 | Coated 610-16-1 before test |
| 1E[c] |  | 38.72 | 1.97 |  | 59.15 | 3000°C. - 1 hr. |

[a]Resin kernels with no carbon coating tested.
[b]Kernels indicated were coated with dense carbon coating.
[c]Carbon-coated kernels were tested as indicated. Carbon resulting from the coating operation leads to the indicated difference between analyses for bare kernel and coated kernel.

At temperatures of 1800°C. and below, the (400) line, $d = 2.71A$, was a strong line while in the 3000°C. sample the (400) line was very weak. The (411) line, $d = 2.58A$, had a high intensity in the 3000°C. sample, whereas it was very weak in the 2600°C. material. This line was not observed in material heated to 1800°C. or below. These observed changes indicate that the composition of the cubic phase having a unit cell of ≈10.8A changes as a function of the heat treatment temperature. The space group and hence the extinction rules for the structure also apparently depend on the composition and thus upon the thermal treatment given the material.

It is seen that a new and distinct crystal form exists. The amount of new phase as indicated by intensity of lines may vary from sample to sample, but in all cases where thermal stability was demonstrated the new phase was present.

The high degree of thermal stability of the fuel particles described above can be employed with advantage in fabricating composite fuel sticks in which the particles are homogeneously distributed within a carbon or graphite matrix.

A satisfactory binder mixture was prepared by blending −200 mesh Robinson coke (manufactured by Carbon Products Division, Union Carbide Corporation), Thermax carbon black (manufactured by R. T. Vanderbilt Company), and a coal tar pitch (Grade 15V manufactured by Allied Chemical Company). The solids were present in a ratio of 85%:15%, by weight, and 25 parts of coal tar pitch were used per 100 parts of the solids. In order to intimately mix these materials, they were slurry-blended with benzene and mixing continued until the benzene had evaporated. The mass was then cooled, using a liquid nitrogen bath or dry ice, and ground to a powder (−200 mesh).

The matrix powder was mixed with 10 volume percent microspheres (derived from sulfonic acid resins as herein described)(500 μm), 10 volume percent coated $ThO_2$ (800 μm), and 10 volume percent coated inert (carbon) particles (500 μm). After complete mixing, using acetone to wet the surfaces, the material was placed in a die, heated to 130°-150° C. and pressed at 1000 to 4000 psi for 3 min. After injection from the mold (as a ½ × ½ in. right circular cylinder), the pellet was heated to 1000°C. during a 24-hour period to accomplish carbonization of the coal tar pitch. The pellet was then heated to 2600°C. in about 4 hr., held at that temperature for about 30 min. and then cooled in the furnace to room temperature.

The matrix material appeared to be isotropic as is desired to withstand damage under irradiation. The matrix density of a pellet was determined to be 1.55 g/cm³. Fuel distribution was fairly homogeneous as determined by radiography and metallography. No fuel migration was noted after the 2600°C. graphitization treatment.

An alternate procedure for manufacturing nuclear fuel composites of fuel particles within a carbon or graphite matrix is disclosed in U.S. Pat. application Ser. No. 185,641, now U.S. Pat. No. 3,763,292.

What is claimed is:

1. A nuclear fuel kernel comprising a matrix phase of carbon or graphite and a dispersed phase of a crystalline uranium compound consisting essentially of uranium, carbon, an ameba-inhibiting concentration of from 2 to 10 weight percent sulfur, and up to 0.5 weight percent oxygen, said fuel kernel further characterized in that it shows inhibition of uranium migration across a temperature gradient at a temperature in excess of 1200°C. and has an X-ray diffraction pattern which is distinguishable from $UO_2$, UC, or US.

2. The nuclear fuel kernel as claimed in claim 1 wherein the oxygen content is in the range 0.02 to 0.2 weight percent.

3. The fuel kernel of claim 1 which has an X-ray diffraction pattern as shown in FIG. 1D at 2600°C. and an X-ray diffraction pattern as shown in FIG. 1E at 3000°C.

* * * * *